R. T. ROBINSON, Jr.
INTERNAL COMBUSTION ENGINE.
APPLICATION FILED MAY 31, 1913.
1,130,843.
Patented Mar. 9, 1915.
5 SHEETS—SHEET 4.
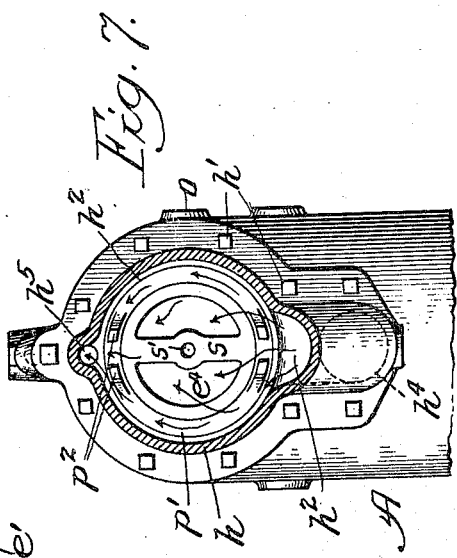
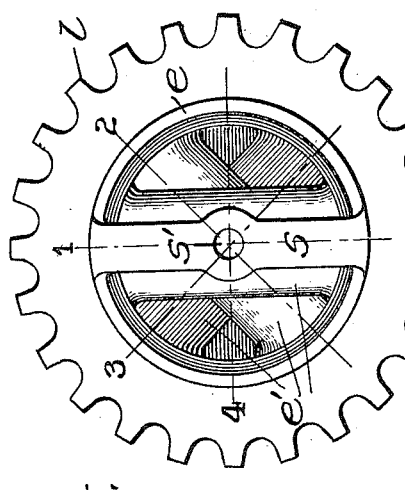
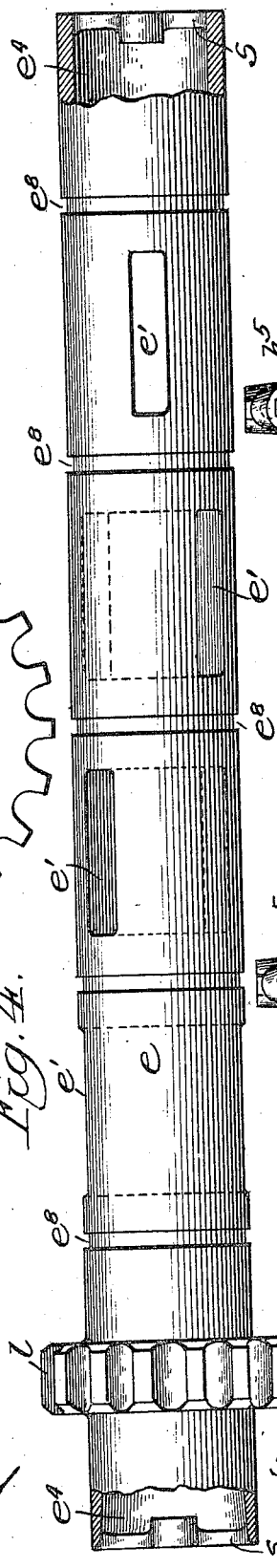
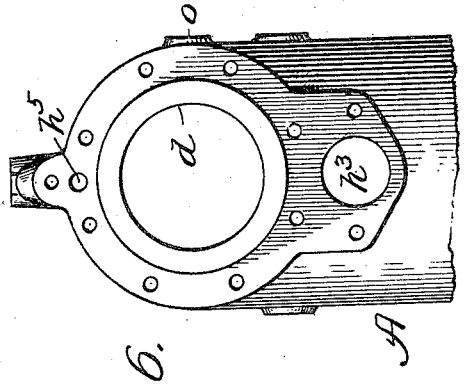
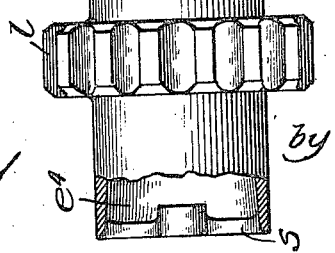

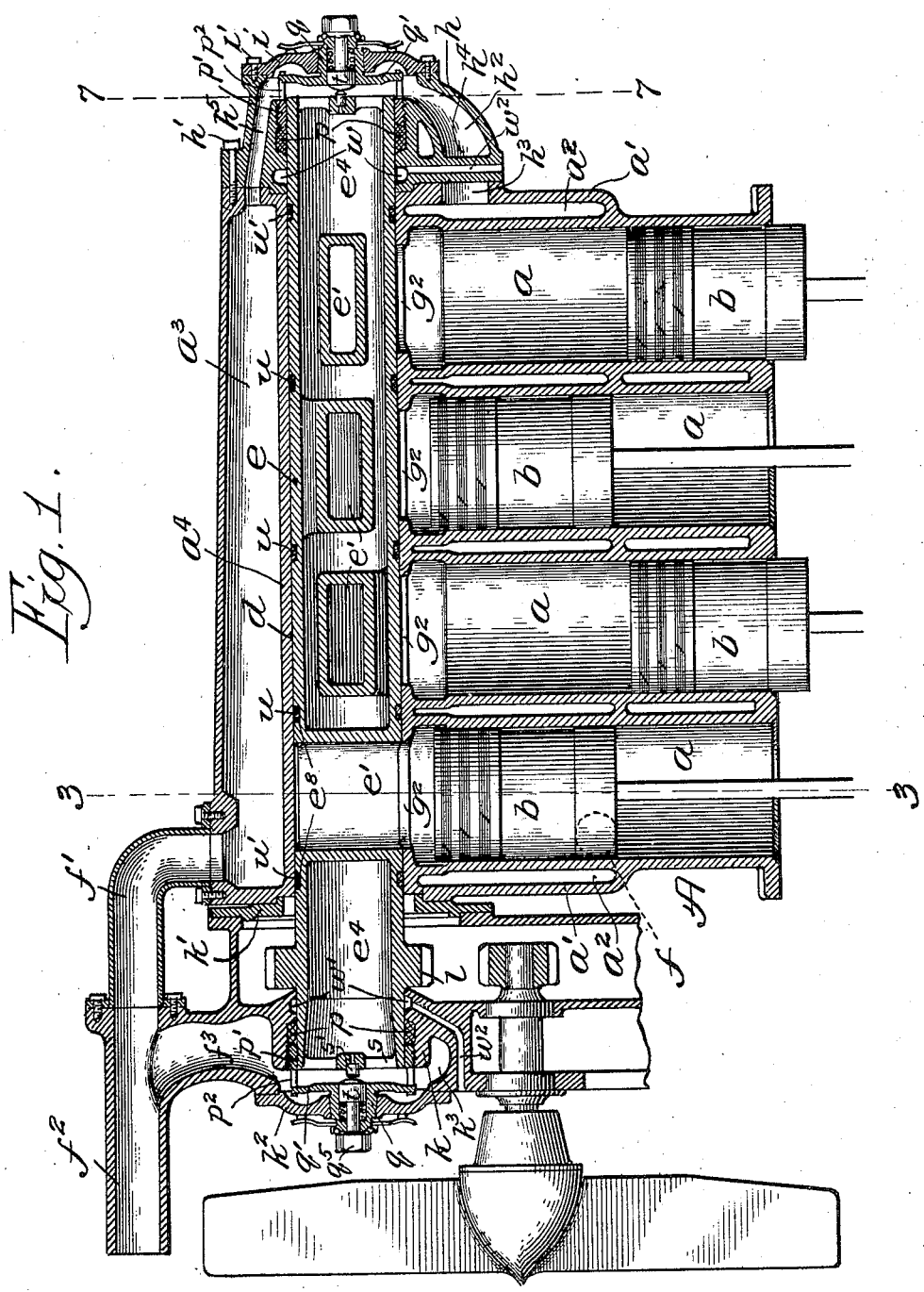

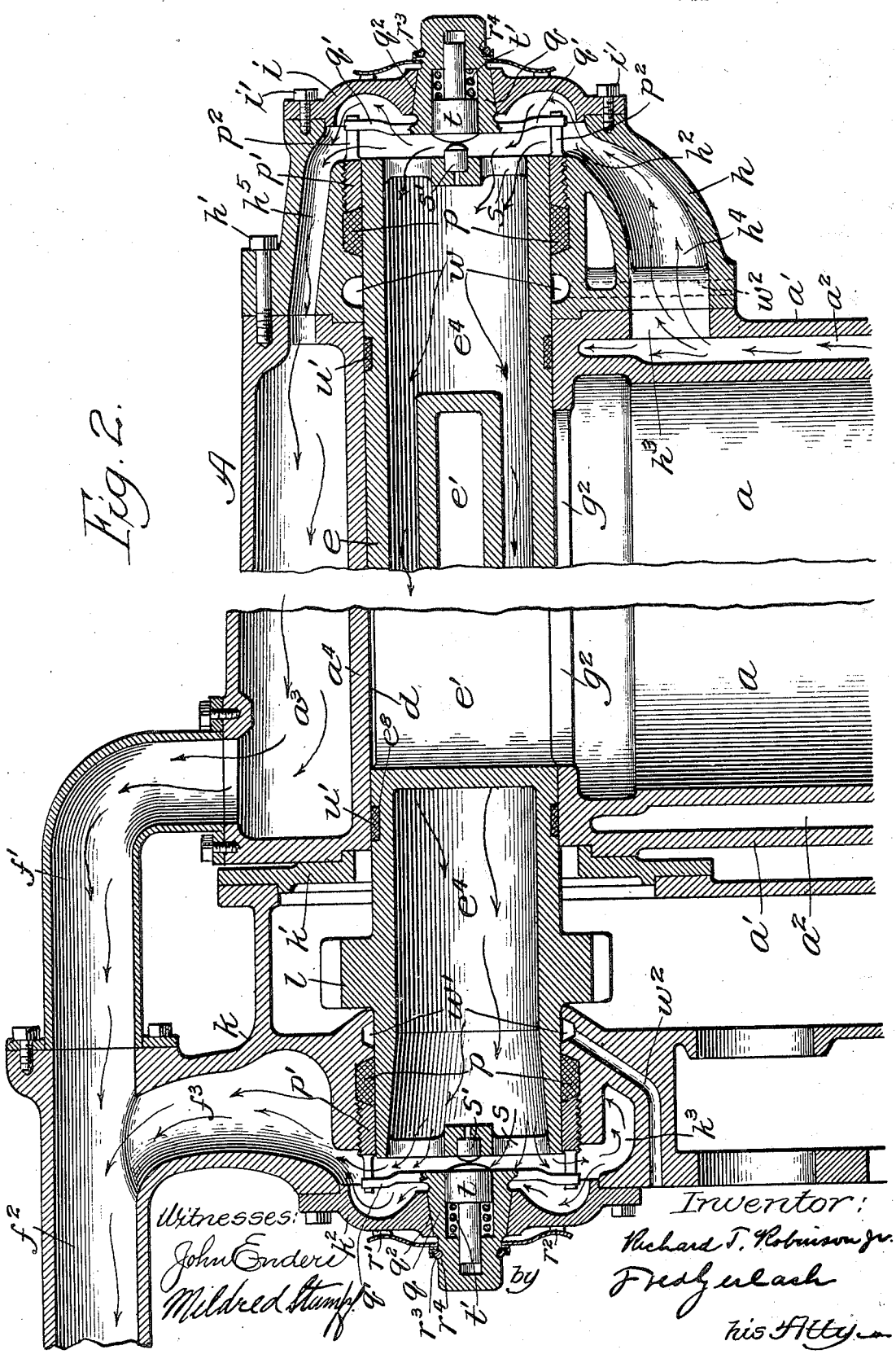

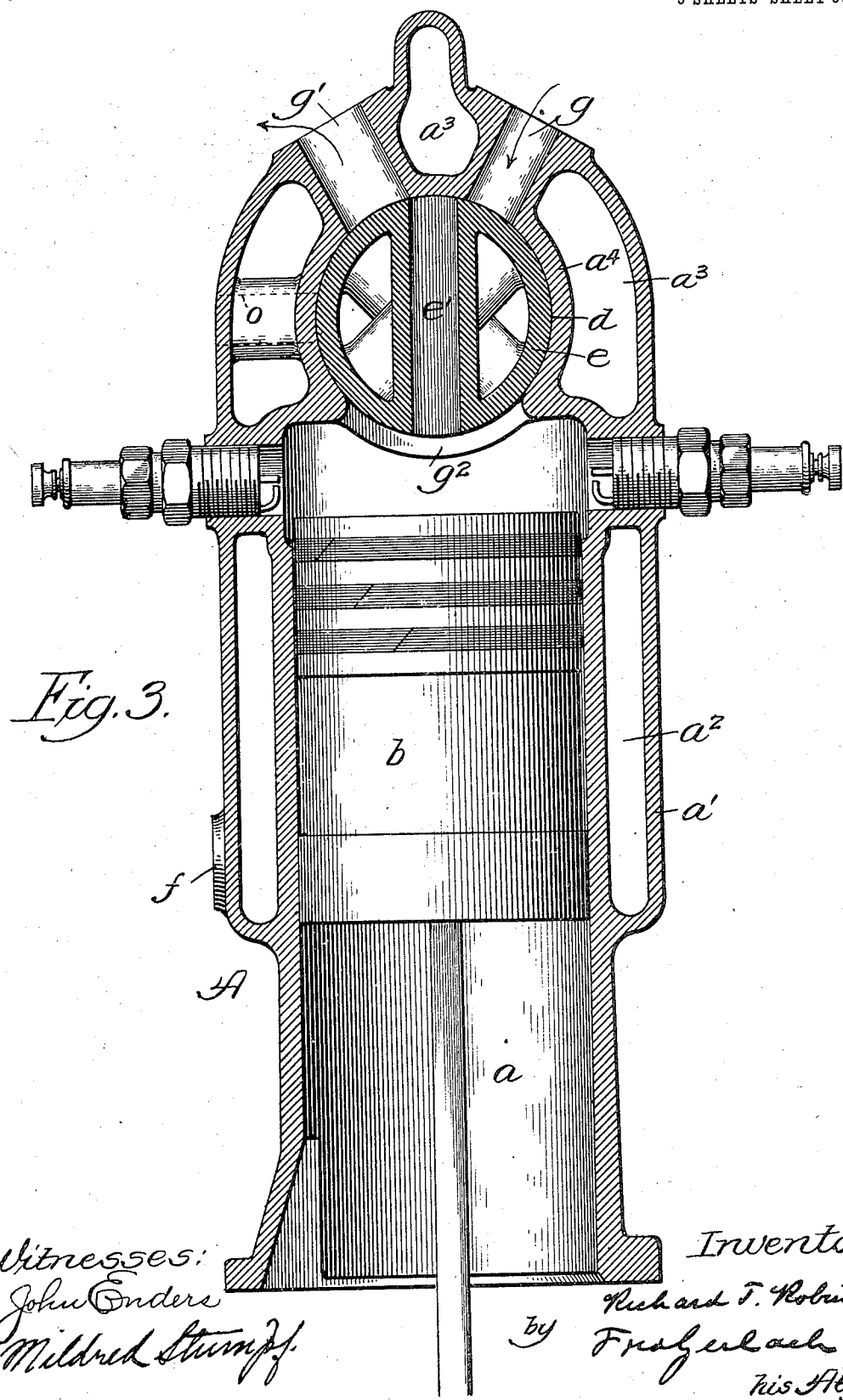

R. T. ROBINSON, Jr.
INTERNAL COMBUSTION ENGINE.
APPLICATION FILED MAY 31, 1913.
1,130,843.
Patented Mar. 9, 1915.
5 SHEETS—SHEET 5.
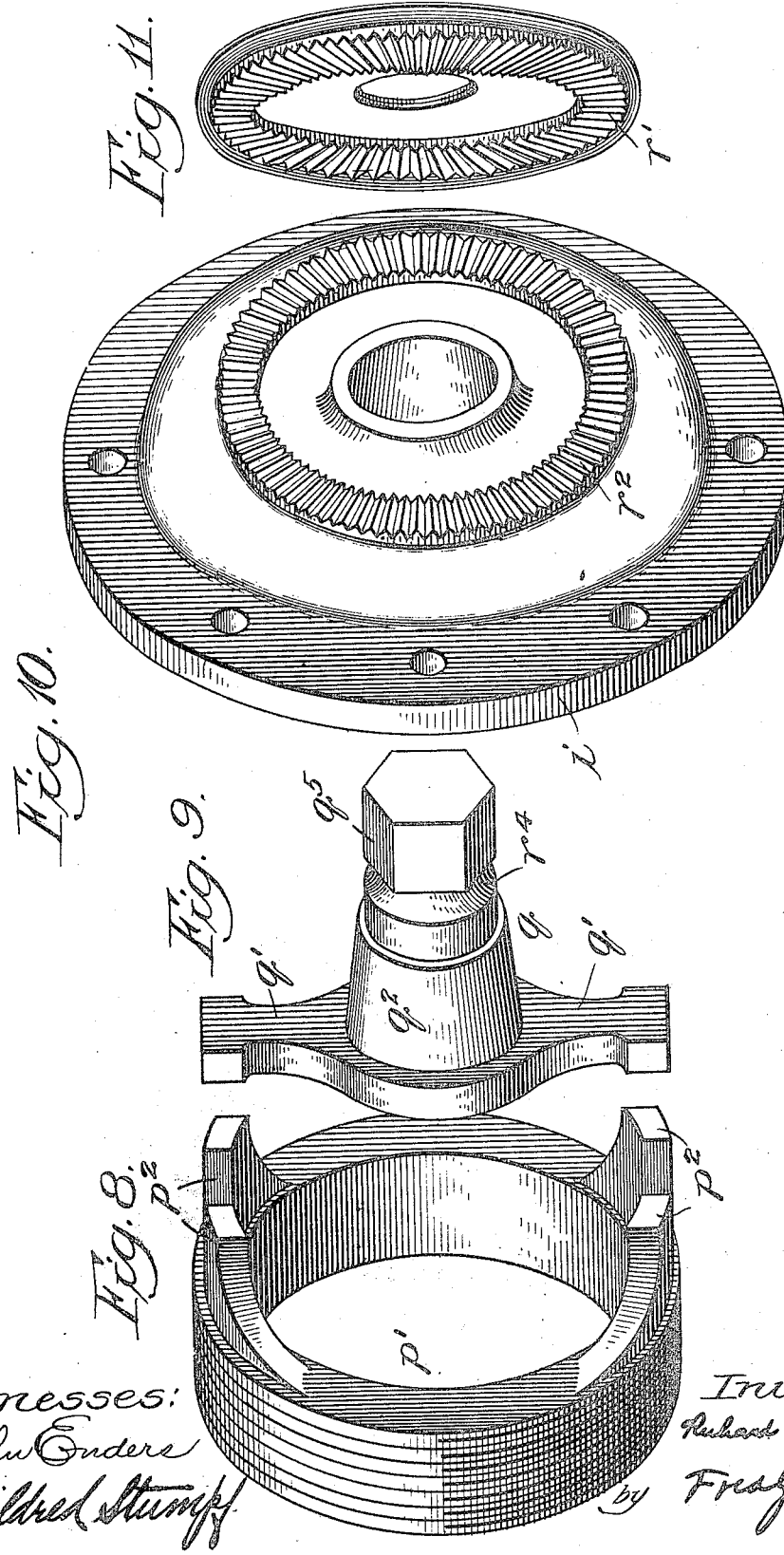
Witnesses:
John Enders
Mildred Stumpf
Inventor:
Richard T. Robinson Jr.
by Fred Gerlach
his Atty.

UNITED STATES PATENT OFFICE.

RICHARD T. ROBINSON, JR., OF COLORADO SPRINGS, COLORADO, ASSIGNOR TO ROBINSON & ROBINSON, A COPARTNERSHIP CONSISTING OF RICHARD T. ROBINSON AND RICHARD T. ROBINSON, JR., OF COLORADO SPRINGS, COLORADO, AND RACINE, WISCONSIN.

INTERNAL-COMBUSTION ENGINE.

1,130,843.   Specification of Letters Patent.   Patented Mar. 9, 1915.

Application filed May 31, 1913. Serial No. 770,870.

*To all whom it may concern:*

Be it known that I, RICHARD T. ROBINSON, Jr., a resident of Colorado Springs, in the county of El Paso and State of Colorado, have invented certain new and useful Improvements in Internal-Combustion Engines, of which the following is a full, clear, and exact description.

The invention relates to internal combustion engines and more particularly to the means for cooling the same.

It has heretofore been proposed to employ rotary valves in explosive engines and to circulate separate streams of cooling-water through the rotary-valve and the water-jackets around the cylinders. In practice, it has been found that if the rotary-valve and the cylinder or valve seat are of substantially the same temperature, the valve will work smoothly in its seat and high efficiency will be attained. It has also been found in practice, that if water circulated through the valve is colder or lower in temperature than the water circulating through the water-jackets of the cylinder around the valve-seat or vice-versa, then the valve will not work properly in its seat and will not be efficient in controlling the flow of fluids. That is, if the valve and its seats are different in temperatures, the valve will not operate efficiently and smoothly in its seat.

Another attribute of prior structures was, that it was necessary to provide a water-tight connection between the rotary valve and stationary inlet and outlet pipes.

One object of the invention is to provide an improved engine in which provision is made for maintaining proper relative or substantially the same temperature of the rotary-valve and the valve-seat. This result is attained by dividing the circulating stream of cooling-water, so that a portion thereof will pass through the valve and another portion will pass through the water-jacket around the cylinders or the valve-seats and thereby the temperature of the water used for cooling the valve and the seat will be substantially the same, despite any variation in the temperature of the water and water of substantially the same temperature will be circulating around the valve, its seat, and the cylinders at all times.

Another object of the invention is to provide cooling-means which will effectively prevent the formation of steam-pockets which result from the presence of places in which there is no effective circulation.

The invention further designs to provide an explosive-engine of improved construction. The invention consists in the several novel features hereinafter set forth and more particularly defined by claims at the conclusion hereof.

In the drawings: Figure 1 is a vertical longitudinal section of an explosive engine embodying the invention. Fig. 2 is a similar view on a larger scale. Fig. 3 is a transverse section taken on line 3—3 of Fig. 1. Fig. 4 is a detail of the rotary valve. Fig. 5 is an end elevation of said valve. Fig. 6 is an end view of the valve-casing, the head being removed. Fig. 7 is a section taken on line 7—7 of Fig. 1. Fig. 8 is a detail perspective of one of the packing adjusting rings. Fig. 9 is a perspective of one of the adjusting-spindles. Fig. 10 is a perspective of one of the caps at the outer ends of the valve-casing. Fig. 11 is a perspective of one of the rings for holding the spindles.

The engine comprises a suitable casting A in which the cylinders $a$, in any desired number, usually four, are formed. Pistons $b$ are slidably fitted in the cylinders in the usual manner, to drive a crank-shaft (not shown) as well understood in the art. A cylindrical valve-seat $d$ is formed in a wall $a^4$ of case A and extends longitudinally across the top of all the cylinders. A cylindrical rotary-valve $e$ is fitted in the seat $d$. The casting A serves as an engine-casing and comprises an outer wall or shell $a'$ which provides a water-jacket around the cylinders, a chamber $a^2$ being formed between the cylinder-walls and the outer wall, for the circulation of cooling-water. An inlet connection $f$ is formed in one side of wall $a'$ for a pipe which conducts cold water to the water-chamber in the casing, this pipe being usually connected to a circulating pump which receives water from the cooler or radiator, (not shown), as usual in the art. The top of one end of the engine-casing A is provided with an outlet $f'$ to which a discharge-pipe $f^2$ is connected, for conducting the cooling water, after it has cooled the cylinders and valve, to the radiator.

The outer walls of casing A are formed to leave a water-chamber $a^3$ around wall $a^4$ in which the valve-seat $d$ is formed, and this chamber communicates with the chambers $a^2$ around the cylinders. Resultantly, water forced into these chambers will cool the surrounding walls of all the cylinders and the valve-seat.

The rotary valve is formed with relatively offset through-ports $e'$ (one for each cylinder) to successively serve as exhaust and intake ports. At one side of the top of casing A, an inlet port $g$ is formed for each cylinder and at its opposite side an exhaust-port $g'$ is formed for each cylinder. An opening $g^2$ is formed between the valve-seat and each of the cylinders, respectively. A suitable manifold (not shown) supplies combustible fluid to all of the inlet ports and an exhaust manifold (not shown) carries off the products of combustion escaping through all of the ports $g'$, as well understood in the art. The operation of each of the valve-ports for the several cylinders will be the same, except that they will operate in properly timed succession to cause the pistons to be operated successively, as well understood in the art.

In operation, valve $e$ will be continuously rotated in the proper ratio, (usually 1 to 4) to the engine-shaft, so that during the initial down-stroke or first cycle, a charge of combustible mixture will be drawn through inlet $g$, valve-port $e'$ and opening $g^2$, and into the cylinder. During the compression-stroke and the power-stroke, the valve-port will remain closed and during the fourth cycle, said port will be disposed to permit the products of combustion to escape through the exhaust port $g'$. Water entering the bottom of the water-jacket at inlet $f$ will circulate around the cylinder-walls and also around the valve-casing or wall $a^4$ in transit to the outer pipe $f'$.

Valve $e$ extends from end to end of the body section of valve-casing $a^4$ and projects beyond the ends thereof. The rotary valve is hollow or tubular to provide a passage or chamber $e^4$ extending from end to end thereof, so water will flow longitudinally through the valve.

The rear end of valve $e$ terminates in a head $h$ which is fitted and secured to the casing A, by bolts $h'$. This head is provided with a chamber or duct $h^2$ which receives water from the water-chamber $a^2$ around the cylinders, through a port $h^3$ in the end of casing A and an inlet port $h^4$ in the head. A cap $i$ is removably secured to the head by bolts $i'$ to afford access to the outer end of the valve $e$. The chamber $h^2$ serves to conduct water into one end of valve $e$ adjacent said chamber, the end of the valve being open to direct water from chamber $h^2$ into the water-chamber $e^4$ in the rotary valve. A small by-pass duct $h^5$ is formed in the head $h$ and conducts water from the top of chamber $h^2$ to one end of the water-chamber $a^3$ to prevent the formation of air or steam pockets in the valve, the head $h^2$, or in one end of chamber $a^3$. The front end of valve $e$ is also open and is disposed in a valve-head $k$ which is secured with a ring $k'$, to, the front end of casing A. The outer end of head $k$ is provided with a removable cap $k^2$ to afford access to the valve when desired. A water-chamber $k^3$ is formed in head $k$ to conduct water flowing out of the rotary-valve to a duct $f^3$ in the head $k$, which conducts the water to outlet-pipe $f^2$. As a result of this construction, cold water passing to the water-jacket through inlet $f$ will initially circulate around the engine-cylinders $a$ where its temperature will be raised. A portion of this water will flow around the wall $a^4$ in which the valve-seat for the rotary-valve $e$ is formed, to cool said wall, and after that the water will flow to the outlet $f'$. Another portion of the water will pass through opening $h^3$ at the rear end of the casing to the water-chamber in head $h$, thence into one end of the rotary-valve $e$ and thence through the chamber in said valve to cool the cylindrical wall of the valve and the walls around the ports $e'$ which control the passage of fluid to and from the engine-cylinders. This water, after passing through the rotary-valve, passes through chamber $k^3$ and duct $f^3$ in head $k$ to the water-outlet $f^2$. Resultantly, the cooling water, after passing around the engine-cylinders is divided into two streams, one of which flows through and cools the rotary-valve and the other of which flows around and cools the wall of the valve-seat. This manner of circulating the cooling liquid causes effective equalization of the temperature of all portions of the rotary-valve and the valve-casing, so that there will be, at substantially all times, corresponding variation in the temperature of the rotary-valve and its seat, which will cause substantially equal expansion or contraction of the valve and the walls forming its seat, so that the fit and operation of the rotary valve will not be materially affected by variations in the temperature, because the variations will not be relative. The by-pass $h^5$ effectively prevents the formation of any air or steam pockets in the outer end of the valve or the adjacent end of the chamber around the valve-seat, because there is escape for the liquid from the highest portion of the water-chamber in the head to the adjacent end of chamber $a^3$. A sprocket-wheel $l$ is provided on an exposed portion of the rotary-valve, and this sprocket wheel may be driven by any suitable mechanism from the crank-shaft.

Lubricant is supplied to the periphery of the rotary-valve $e$ and to the valve-seat $d$ through one or more ducts $o$ at one side of the casing, from any suitable source of supply. In practice, it is desirable to prevent the escape of lubricant to the water-chamber and also to exclude water from the working surfaces of the valve and its seat. For this purpose, a packing $p$ is provided around each end of the rotary-valve in the heads in which its ends terminate. It is desirable to adjust this packing without opening the water-chamber which would make it necessary to drain the engine before the packing could be adjusted and to this end devices are provided for adjusting the packings from the outside of the casing. A follower ring $p'$ is provided for each packing $p$. Each follower is screw-threaded to its head, is provided with oppositely disposed pairs of lugs $p^2$. An adjusting-stud or spindle $q$ for each follower, is provided with a pair of oppositely disposed arms $q'$ which extend between said pairs of lugs to cause the follower to rotate with the stud, the slidable fit between the arms and the lugs permitting the follower to move into and out of the head. Each stud $q$ passes through one of the caps $i$, on the heads, respectively, and has a tapered portion $q^2$ fitting in a correspondingly tapered opening in the cap to form a water-tight joint between the stud and the cap. The outer end of each stud $q$ is of suitable shape as at $q^5$, for the application of a turning-tool or wrench. A spring-ring is provided to hold each stud seated in its head, and is formed with teeth $r'$ adapted to engage an annular series of teeth $r^2$ on the outside of caps respectively. The inner end of each ring bears against a ring $r^3$ held in a groove $r^4$ on the stud. Said rings are formed of spring-metal, and serve to hold the studs against rotation and firmly seated in the tapered sockets in the caps. A cross-rib $s$ is formed in each end of the rotary-valve $e$ and a bearing pin $s'$ is secured therein. A plunger $t$, is slidably held in each cap and is acted upon by a spring $t'$. These engage the pins $s'$ and serve to hold the rotary-valve against longitudinal movement in its seat. A packing-ring $u$ is provided in the rotary-valve and between each pair of adjacent valve-ports $e^3$ and each pair of cylinders. Said rings are held in annular grooves $e^8$ in the valve. A similar ring $u'$ is provided in the valve at each end of the casing A. These packings serve to effectively prevent escape of fluid from one cylinder to another, and the escape of fluid at the valve-ends, between the working-faces of the valve and its seat.

An annular channel $w$ is formed in head $h$ and a similar channel is formed in the head $h$. These channels are open to the periphery of valve $e$. A duct $w^2$ leads from the lower portion of each of the channels $w$ and $w'$. Channel $w$ prevents the passage of oil on the periphery of the valve into the water-chamber at the adjacent end thereof. Channel $w'$ prevents oil on the valve from passing to the water-chamber at the other end of the valve. These channels $w$ and $w'$ also catch any water which may leak in through packings $p$, so it will escape through one of the ducts $w^2$. Furthermore, when water is seen discharging from outlet-ducts $w^2$, it will indicate that adjustment of the packing should be made. In other words, it serves to indicate any leakage of water at packings $p$.

Certain features claimed in an application being filed concurrently herewith by A. E. Winckler are not claimed in this application.

The invention thus provides an improved explosive-engine embodying an efficient water-cooled valve which will be cooled correspondingly to its seat, so that there will be no relative variation of temperature of the working-faces and corresponding expansion and contraction which will not prevent proper working fit and efficient operation of the engine at all times. The invention also exemplifies an engine in which the valve is inclosed in the engine casing to establish passage for the cooling liquid between the water-jacket around the cylinders into the valve. It also exemplifies means for preventing steam or air pockets from forming in the water passages. It will be observed that the openings in the ends of the rotary valves are not reduced in size relatively to the size of the chamber in the body of the valve. This formation prevents a pocket or chamber from being formed in the valve.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In an internal combustion engine, the combination of a casing having a water-chamber therein, a cylinder, a horizontally disposed cylindrical rotary valve mounted in the casing and having a chamber for the passage of water longitudinally therethrough, and means for conducting water to said chamber, the valve having an outlet for the water at one end which is substantially unrestricted to permit water to flow freely from all parts of the chamber to prevent the formation of air or steam pockets in the valve.

2. In an internal combustion engine, the combination of a casing having a water-chamber therein, a cylinder, and a cylindrical horizontally disposed rotary valve mounted in the casing having a chamber for the passage of water longitudinally therethrough and having open ends, the openings at the ends being substantially unrestricted to permit water to flow freely through all portions of the chamber to prevent the formation of air or steam pockets in the valve.

3. In an internal combustion engine, the combination of a casing having a water-chamber therein, a cylinder and a rotary valve mounted in the casing, having a chamber for the passage of water longitudinally therethrough and having open ends, the opening at one end leading from substantially the highest point of the chamber in the valve and the opening at the other end leading to substantially the top of the chamber in the valve.

4. In an internal combustion engine, the combination of a casing, a cylinder, a valve seat in the casing, a water-jacket around the cylinder, a rotary valve having ports for controlling fluid to and from the cylinder, means in the casing for conducting water to one of the ends of the valve, the valve having a chamber for the passage of water longitudinally through the valve, the valve having an outlet-opening in one of its ends substantially as large as the chamber in the valve.

5. In an internal combustion engine, the combination of a casing having a water chamber therein, a cylinder, a rotary valve mounted in the casing, having a chamber for the passage of water longitudinally therethrough and having one of its ends open, and means for conducting water into said valve, the opening in said end of the valve leading from the top of the chamber in the valve to prevent the formation of air or steam pockets in the valve.

6. In an internal combustion engine, the combination of a cylinder, a rotary-valve for controlling the supply of fluid to and from the cylinder, having a chamber therein, extending therethrough, means inclosing the ends of the valve, the latter having openings in its ends as large as the chamber in the valve to prevent the formation of air or steam pockets in the chamber in the valve, and means for causing water to flow through the valve.

RICHARD T. ROBINSON, Jr.

Witnesses:
MILDRED STUMPF,
ETHEL GERLACH.